United States Patent [19]
Amano et al.

[11] Patent Number: 5,773,042
[45] Date of Patent: Jun. 30, 1998

[54] INJECTION MOLDING UNIT FOR LONG FIBER-REINFORCED THERMOPLASTIC RESIN

[75] Inventors: Itaru Amano; Tatsuya Tanaka; Koji Kuroda; Hiroaki Kondo; Tsutomu Nagaoka; Seiji Yasui; Hiromi Kihara, all of Takasago, Japan

[73] Assignee: Kabushiki Kaisha Kobe Seiko Sho, Kobe, Japan

[21] Appl. No.: 541,464

[22] Filed: Oct. 10, 1995

[30] Foreign Application Priority Data

Oct. 14, 1994 [JP] Japan ..................................... 6-249240
Jun. 2, 1995 [JP] Japan ..................................... 7-136687
Oct. 6, 1995 [JP] Japan ..................................... 7-259974

[51] Int. Cl.[6] .............................................. B29C 45/54
[52] U.S. Cl. .................. 425/207; 425/382.3; 425/382.4; 425/557; 425/558; 425/559
[58] Field of Search ............................. 425/382.3, 382.4, 425/557, 558, 559, 205, 207

[56] References Cited

U.S. PATENT DOCUMENTS

| | | | |
|---|---|---|---|
| 3,296,353 | 1/1967 | Nouel ....................................... | 425/557 |
| 3,470,584 | 10/1969 | Iwata et al. .............................. | 425/207 |
| 4,082,488 | 4/1978 | Brinkschroder et al. ............... | 425/207 |
| 4,797,245 | 1/1989 | Sonoda ................................... | 425/328.4 |
| 4,842,507 | 6/1989 | Kawaguchi et al. .................. | 425/382.4 |
| 5,123,833 | 6/1992 | Parker ..................................... | 425/557 |

FOREIGN PATENT DOCUMENTS

| | | | |
|---|---|---|---|
| 62-187007 | 8/1987 | Japan ..................................... | 425/205 |
| 5-131509 | 5/1993 | Japan ..................................... | 425/557 |
| 292356 | 11/1953 | Sweden ................................. | 425/557 |

*Primary Examiner*—Robert Davis
*Attorney, Agent, or Firm*—Oblon, Spivak, McClelland, Maier & Neustadt, P.C.

[57] ABSTRACT

An injection molding process for forming high strength, long fiber-reinforced thermoplastic resin, and for holding damage to the pellet-shaped thermoplastic resin to a minimum even when being plasticized, and maintaining the fiber length of pellet-shaped fiber bundles while unwinding the fibers and melting the resin. After the long fiber-reinforced thermoplastic resin has been heated and melted, pressure is applied to unwind the long fiber-reinforced thermoplastic resin while melted, and injection molding then performed.

19 Claims, 9 Drawing Sheets

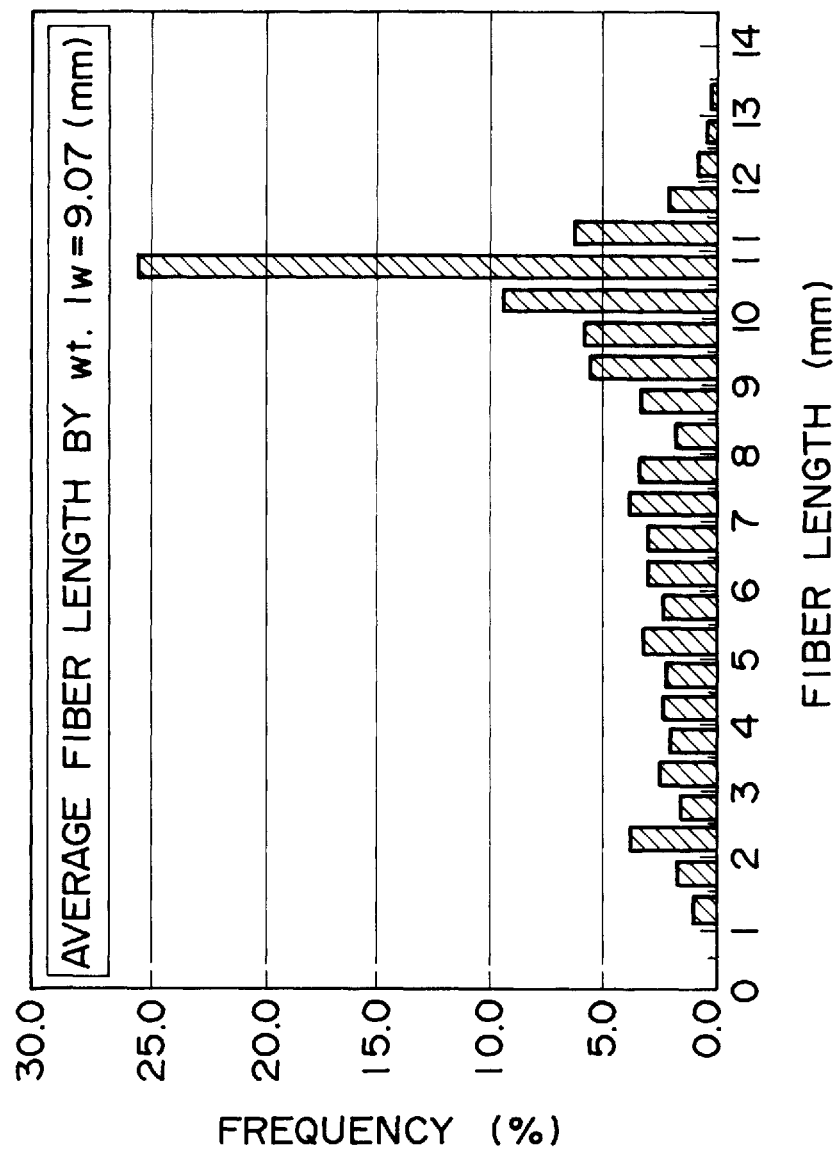

ible amount of this mixed resin is sent from the gap space t which forms an oblique space between the tip of the outer cylinder 109 and the screw head 117a, to be accumulated only in a specified amount inside of the heating cylinder 106. The injection ram then reverses by means of the movable platen 105 and the outer cylinder 109 due to the pressure of the accumulated resin. When hydraulic pressure is then conveyed to the port 121 accompanying the release of pressure inside the injection ram 113 from the port 120, the injection ram 113 advances, the screw 117 next advances by means of the movable platen 105 and the outer cylinder 109, and the resin inside the heating cylinder 106 is injected from the nozzle 107 into the mold. Since hydraulic pressure has been released from the port 120 at this time, the closing ram 116 is freed and the tip head 117a of the screw 117 reverses with respect to the outer cylinder 109. Therefore, there is no back flow of resin because injection starts after the gap space t has closed due to the initial advance of the outer cylinder 109.

INJECTION MOLDING UNIT FOR LONG FIBER-REINFORCED THERMOPLASTIC RESIN

BACKGROUND OF THE INVENTION

1. Field of the Invention

This invention relates to an injection molding process and injection molding unit utilizing pellet-shaped thermoplastic resin strengthened with material such as glass fibers of a relatively long (3 mm to 25.4 mm) length.

2. Description of the Related Art

Conventionally, resin is hardened by mixing in fibers such as glass in order to improve the strength of the resin. This resin is formed in a pellet shape for easy transport and thermoplasticized to make the melting and extrusion processes easier. Fibers are mixed in with this resin to improve the strength and an injection process utilized to produce thermoplastic parts for use in automobiles, electrical appliances, office automation equipment, and the construction and engineering fields.

Various means have been proposed as equipment for injection molding of this kind of fiber-reinforced thermoplastic resin. An example of a screw-type injection molder of for example, laid-open Japanese Patent Publication No. 46-2909 is shown in the fragmentary cross-sectional view in FIG. 7 in which on the machine base 101, the fixed platens 103 and cylinder platens 104 are connected at four corners by the tie rods 102. The movable platen 105 is supportably fixed on the tie rod 102 to freely move backwards and forwards with respect to the fixed platen 103. Securing hardware not shown in the figure is mounted on the outer side of fixed platen 103. The heating cylinder 106 on the inner side, is insertably mounted in the nozzle hole of the tip of the nozzle 107. The heater 108 is provided to heat the heating cylinder 106. The outer cylinder 109 is secured so as to insertably engage its tip to freely move forwards and backwards in the heating cylinder 106. The heater 110 is mounted on the circumferential surface of outer cylinder 109. The cylinder 112 of the injection cylinder 111 on the other hand, is integrated in cylinder platen 104. The injection ram 113 having a bottomed cylinder shape is secured inside the movable platen 105 and insertably mounted so as to move forward and back freely inside the inner hole of the cylinder 112. The low speed variable motor 114 is secured at the end of injection cylinder 111 and the rotating shaft 115 is insertably mounted so as to rotate freely in the shaft hole of the injection ram 113. At the linked section at the tip of the rotating shaft 115, the cylindrical-shaped closing ram 116 is insertably mounted for free movement only in the rotation direction, defined by injection ram 113. The rotating shaft 115 and the screw 117 on the same axis are integrably mounted for free movement only in the rotation direction. This screw 117 is inserted for free back and forth movement in the outer cylinder 109. The oblique surface of a funnel is formed facing the oncoming tip head 117a of the screw 117. The thrust bearing 118 is mounted in between the closing ram 116 and the movable platen 105. The hopper 119 supplies resin between the screw 117 and the outer cylinder 109 to which screw 117 is secured. The port 120 conveys hydraulic pressure to the empty space between the injection ram 113 and the closing ram 116. The port 121 conveys hydraulic pressure to the injection cylinder 111.

The operation of the injection molder configured as above is described next. The hydraulic motor 114 is driven and hydraulic pressure from the port 120 inside the injection ram 113 is supplied. The closing ram 116 is driven to the end of the front stroke, and the tip head 117a of the screw 117 separates from the leading edge of outer cylinder 109. When resin is supplied from the hopper 119 to the periphery of the screw 117, this resin advances along the inner groove while weakly mixing due to the rotation of the screw 117. A fixed amount of this mixed resin is sent from the gap space t which forms an oblique space between the tip of the outer cylinder 109 and the screw head 117a, to be accumulated only in a specified amount inside of the heating cylinder 106. The injection ram then reverses by means of the movable platen 105 and the outer cylinder 109 due to the pressure of the accumulated resin. When hydraulic pressure is then conveyed to the port 121 accompanying the release of pressure inside the injection ram 113 from the port 120, the injection ram 113 advances, the screw 117 next advances by means of the movable platen 105 and the outer cylinder 109, and the resin inside the heating cylinder 106 is injected from the nozzle 107 into the mold. Since hydraulic pressure has been released from the port 120 at this time, the closing ram 116 is freed and the tip head 117a of the screw 117 reverses with respect to the outer cylinder 109. Therefore, there is no back flow of resin because injection starts after the gap space t has closed due to the initial advance of the outer cylinder 109.

One example of the operation and structure of a screw-type injection molder was described above however the following problem occurs with this screw type molder according to the type of molding material used. Namely, the screw type molder affects the mechanical properties of molding material which include relatively long (3–25.4 mm) glass fibers which in turn have a large effect on the glass fibers of the molded end product. These glass fibers which are long and equally distributed give the end product improved mechanical strength, but when the mold material in the screw type injection molder is sent by the screw 117, the glass fibers in the material become kneaded and damaged so that the amount of long fibers decrease and there is a drastic drop in material strength.

As one countermeasure for this problem, the dual shaft kneader and accumulator of FIG. 8 having a flange type injection molder was proposed. In other words in a dual shaft kneader and accumulator 122 having two screws arranged in parallel, a barrel 122 supplies thermoplastic resin and a barrel 124 supplies glass fibers, and the two screws are made to rotate mutually in the same direction and speed. Each type of material is kneaded by the kneading disk and supplied to the accumulator 122 after air is removed from the vent 125. Hydraulic pressure is applied downwards on the piston 128 after the rotary valve 127 is opened, and resin supplied to the injection cylinder 130 by the plunger 129. Whereupon the plunger 133 is moved forward by the opening of the rotary valve 131 and operation of the cylinder 132, and the nozzle 134 then injects the mixture of fiber and resin from the injection cylinder 130, into the mold.

This injection molder uses the dual shaft kneader and accumlator 122 as a plasticizing device, and since the composite material is directly plasticized without being formed in a pellet shape, the damage to the fibers from plasticization and pelletization is prevented.

Another countermeasure has been proposed in Japanese Patent Laid-open No. 6-198688. The invention in this laid open patent proposed various means to limit damage to the reinforcing fiber material in the injection method such as; reducing the size (ratio of length to diameter) of the molder, enlarging the nozzle size, and reducing the compression ratio. However since there was a limit to the effectiveness of these methods in limiting damage to the fiber reinforced material (refer to lines 8 through 13 in the 2nd column of the above patent) the pressure on the accumulated melted resin was reduced to essentially zero by regulating the rearward movement of the screw or the flange, when malting the resin stock and accumulating it in the forward direction of the screw. When using this method, a size range of 12 to 18 (L/D) was preferable, and a screw groove depth of 8 to 20 mm in the feed section, and a range of 5 to 15 mm in the metering section were preferable. Further, a compression ratio in the range of 1.2 to 1.8 was mentioned as preferable (refer to lines 35 through 39 in the 5th column of the above patent).

SUMMARY OF THE INVENTION

It is therefore an object of this invention to provide an injection molding process for forming high strength, long fiber-reinforced thermoplastic resin, and maintaining the fiber length of pellet-shaped fiber bundles while the fibers unwind and the resin melts, and for holding damage to the pellet-shaped thermoplastic resin to a minimum even when being plasticized.

A preferred embodiment of this invention is a method in which after the pellet-shaped, long fiber-reinforced thermoplastic resin has been heated and melted, pressure is applied and the long fiber-reinforced thermoplastic resin is unwound, and injection molding then performed.

The thermoplastic resin pellets which have been reinforced with long fibers of approximately 3 to 25.5 mm are heated and melted. While in the melted state, pressure is added to the reinforced thermoplastic resin and disentangled so that in contrast to conventional methods which only melt the resin, or in contrast to methods which knead the resin afterwards or at the same time with screws, this method allows formation in the melted state of a long fiber-reinforced thermoplastic resin with little damage to the fibers and few fiber clumps. Accordingly after injection molding, the resulting product has a relatively uniform distribution of fibers, and only slight variations in product thickness, surface condition, strength and product weight etc. An improved smooth product output can also be expected.

DESCRIPTION OF THE PREFERRED EMBODIMENTS

Figure 1A:
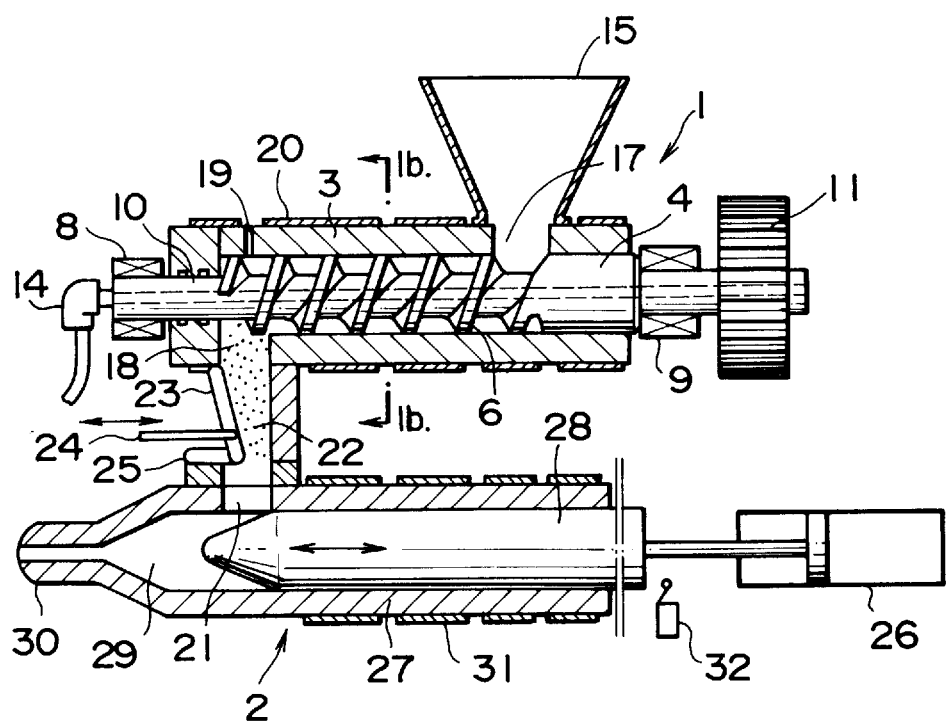
FIG. 1(a) is a front cross-sectional view.

An embodiment of this invention will be described next while referring to the drawings.

(Embodiment 1)

Figure 1B:
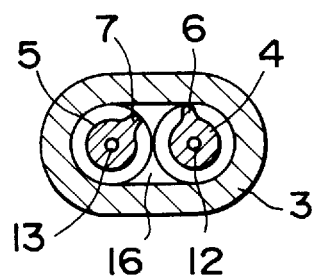
FIG. 1(b) is a cross-sectional view along lines A—A of FIG. 1(a) of the long fiber-reinforced thermoplastic resin injection molding unit of this invention.

Referring to the attached drawings for embodiment 1 of the long fiber-reinforced thermoplastic resin injection molding unit of this invention, in FIG. 1(a) there is shown a front cross-sectional view and in FIG. 1(b) there is shown a cross-sectional view along lines A—A. In these figures, the numeral 1 denotes the dual axis screw plasticizing unit and numeral 2 denotes the injection molder.

First the dual axis screw plasticizing unit is described. The screws 4 and 5 rotating in different directions, are arranged in parallel inside the cylinder 3. The screws 4 and 5 are single-threaded screws and the teeth 6 and 7 for each screw are fixed axially in the cross-sectional view as shown in FIG. 1(b), and the groove for the teeth 6 and 7 as clearly shown in FIG. 1(b) is deep and the compression ratios (compression ratio 1–1.5) are low.

Each of the screws 4 and 5 passes through both ends of the cylinder 3. The shaft bearings 8 and 9 in the outer part of the frame, support the shaft 10. The pulley 11 is secured at one end of the shaft 10 and mutually driven in different directions by an external drive unit. The hearing paths 12 and 13 are provided in the center of the shaft 10 so that a high heat medium can be distributed by means of the rotary joint 14 provided at the other end of the shaft 10.

The hopper 15 is provided in proximity to one end of the cylinder 3. The lower opening of the hopper 15 connects to the opening 17 in the upper part of the cylinder chamber 16 inside the cylinder 3 and the pellets of thermoplastic resin mixed with long fibers dumped from the hopper 15 can be received. The exit 18 is provided at the lower part of the other end of the cylinder 3, and the air hole 19 is formed in the upper end to connect the inside of cylinder chamber 16 with the outside. An electrical heater 20 is provided on the outer circumference of the cylinder 3. The high heat material passing along the heat paths 12 and 13 of the shaft 10 of said screws 4 and 5 is heated to about 200° to 350° C. inside the cylinder chamber 16. The said pellets dumped from the hopper 15 are heated and melted by the above said heating means when conveyed from one and inside the cylinder 16 to the other end by the differing rotation directions of both screws 4 and 5. The gas generated at this time is blown out through the air hole 19. As a heating means in this embodiment, an example was described in which the heating paths 12 and 13 were formed in the shaft 10 for each of the screws 4 and 5, but instead of this method, a cartridge heater may be inserted in the center of the shaft 10, yet another alternative is not to provide a heating means in screws 4 and 5, but instead use only an electrical heater provided in the outer circumference of the screws 4 and 5.

The gate 23 was provided as a pressure application means in the supply path 22 between the exit 18 of the cylinder 3 and the supply hole 21 of injection molder 2. One end of the gate 23 is supported for free movement, the operating rod 24 is in proximity to the other end which is provided with a closing lid 25. This operating rod 24 can be freely stopped in an optional position by means of a hydraulic actuator not shown in the figure. The amount of opening for the supply path 22 is freely set by means of external control equipment, and the path can also be closed.

In the structure of injection molder 2, the resin supplied from inside cylinder chamber 29 is injected into mold (omitted in the drawing) from the nozzle 30 by means of the push-out action of the plunger 28 inside the cylinder 27 by the operation of the hydraulic cylinder 26. A heater 31 is provided in the outer circumference of the cylinder 27 and said heater maintains the specified temperature within the cylinder chamber 29.

In the operation of the said equipment, initially glass fibers of 3 to 25.4 mm, in other words, pellets of thermoplastic resin premixed with long fibers are loaded. The outer circumference of the cylinder 3 is heated by the heater 20 and high heat is transmitted to the two screws 4 and 5 in the heat path 12 and 13 by means of the rotary joint 14 so that the heat inside the cylinder chamber 16 reaches approximately 200° to 350° C. degrees. An outside power source drives the pulley 11 so that the two screws 4 and 5 mutually rotate in different directions at the same speed and the pellets supplied in cylinder chamber 16 by way of the opening 17 from the hopper 15, are conveyed from one end of the cylinder 16 to the other end. In this case, since the transport and the mixture of the pellet is carried out without much kneading and because of low compression ratio and deep grooves in screws 4 and 5, detailed damage to the long threads from cutting during the kneading process is prevented.

Thus, the deficiency of the cutting heat generated by operation of screws 4 and 5 for the pellets in the cylinder 3 is compensated by the above said heating means, and the pellets are melted and conveyed to the exit 18 of the cylinder 3. The gas generated at this time is discharged to the outside through the air hole 19. The pressure of the molten resin sent from the exit 18 in the cylinder 3 can be controlled by the opening and closing of the gate 23. This pressure control allows control of the amount of fiber bundle disentanglement and the release of gas from the air hole 19. Control of the screw rotation allows regulation of the feed pressure and the mixture speed, which in turn allows temperature adjustment of various molten temperatures and allows various types of resin to be used.

The resin mixed with long fibers and maintained at specified pressure by the gate 23 transits the supply path 22 enters the cylinder chamber 29 of the injection molder 2 and makes the plunger 28 reverse. At this time, the correct hydraulic pressure is adjusted in the hydraulic cylinder 26 and the reversing force in the plunger 28 adjusted. This adjustment of pressure inside the cylinder chamber 29 to a suitable level allows a fixed amount of pressure to be supplied in the cylinder chamber 29 improving weight accuracy. When the plunger 28 reverses to the specified position by means of the pressure on the resin supplied by the cylinder chamber 29, the limit switch 32 provided at this position is triggered, closing the gate 23 and also stopping the drive of the screws 4 and 5.

Next a valve (not shown) at the tip of the nozzle 30 opens, operating the hydraulic cylinder 26 and advancing the plunger 28 so that by closing the gate 23, the supply entrance 21 is shut by the closing lid 25 allowing the resin inside to be injected into the mold. After injection, the gate 23 is again allowed to open to a specified position, screws 4 and 5 are driven, and the operation mentioned above is repeated. In the said equipment, the screws 4 and 5 for melting and kneading the resin can be of various types, however a suitable ratio of groove depth to axis diameter is (H/D) about 0.2 to 0.3. The compression ratio is preferably about 1 to 1.5. If kept within this range the kneading and critical conveyance and mixture of the resin can be performed with little damage. A suitable ratio of screw length to diameter is about (L/D) 5 to 15. The pitch of the teeth 6 and 7 on screws 4 and 5 may be formed so that the pitch of either or both of the teeth 6 and 7 in proximity to the hopper 15, is longer than the pellet length (roughly the same as the fiber length). If the teeth are of this size then the long pellet just supplied from the hopper 15, can easily enter the groove and the number of pellets getting stuck between the inner wall of cylinder 3 and the teeth 6 and 7 are greatly reduced and damage to the long fibers is prevented.

The said embodiment lists an example in which the gas inside the cylinder chamber 16 is discharged to the outside by the air hole 19, however the air hole 19 can also be used to introduce an inert gas such as nitrogen into the cylinder chamber 16 and to assist in heating and melting that resin pellet when using a resin with high melting point such as nylon. After heating of the pellet, the low temperature gas is discharged to the outside of the cylinder chamber 16 by means of the hopper 15 etc.

(Embodiment 2)

Figure 2:
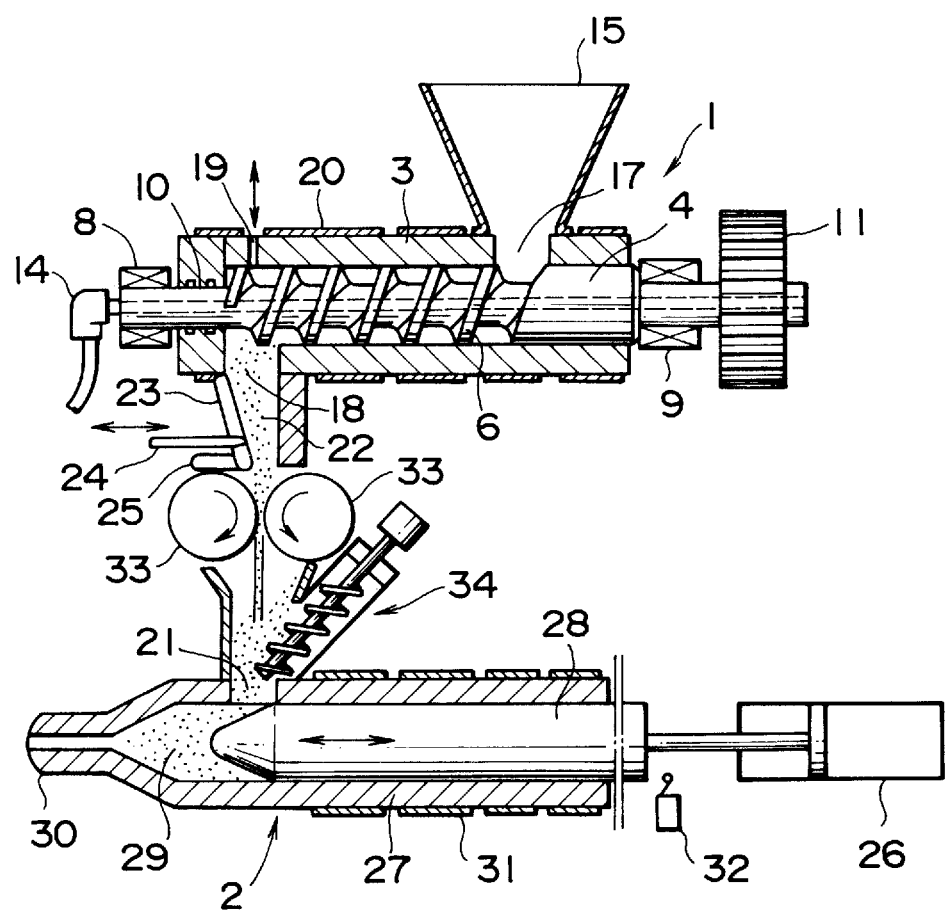
FIG. 2 is a front cross-sectional view of another embodiment of the long fiber-reinforced thermoplastic resin injection molding unit of this invention.

In the first embodiment an example was given for gate 23 as a flat plate supported on one end for free movement but, as shown in FIG. 2, another configuration may be used in which a pair of rollers 33 and 33 rotating in different directions are provided beneath the gate 23 with a screw extrusion unit 34 placed beneath the pair of rollers 33 and 33. In this case, the molten resin is drawn out from between the pair of rollers 33 and 33, and then spread out to disentangle (smooth out the fiber bundles and improve the resin content in the fibers) the long fibers, and then press the resin into the screw extrusion unit 34. The supply of molten resin can be adjusted by changing the gap between the rollers 33 and 33 and rotation speed as necessary, this adjustment in turn allows regulation of the back pressure and adjusting the extent of disentanglement. Therefore in the configuration of this second embodiment, forming of long fibers being further disentangled, and forming of long fiber-reinforced thermoplastic resin of yet further strength can be performed in addition to the effects of the first embodiment.

(Embodiment 3)

Figure 3A:
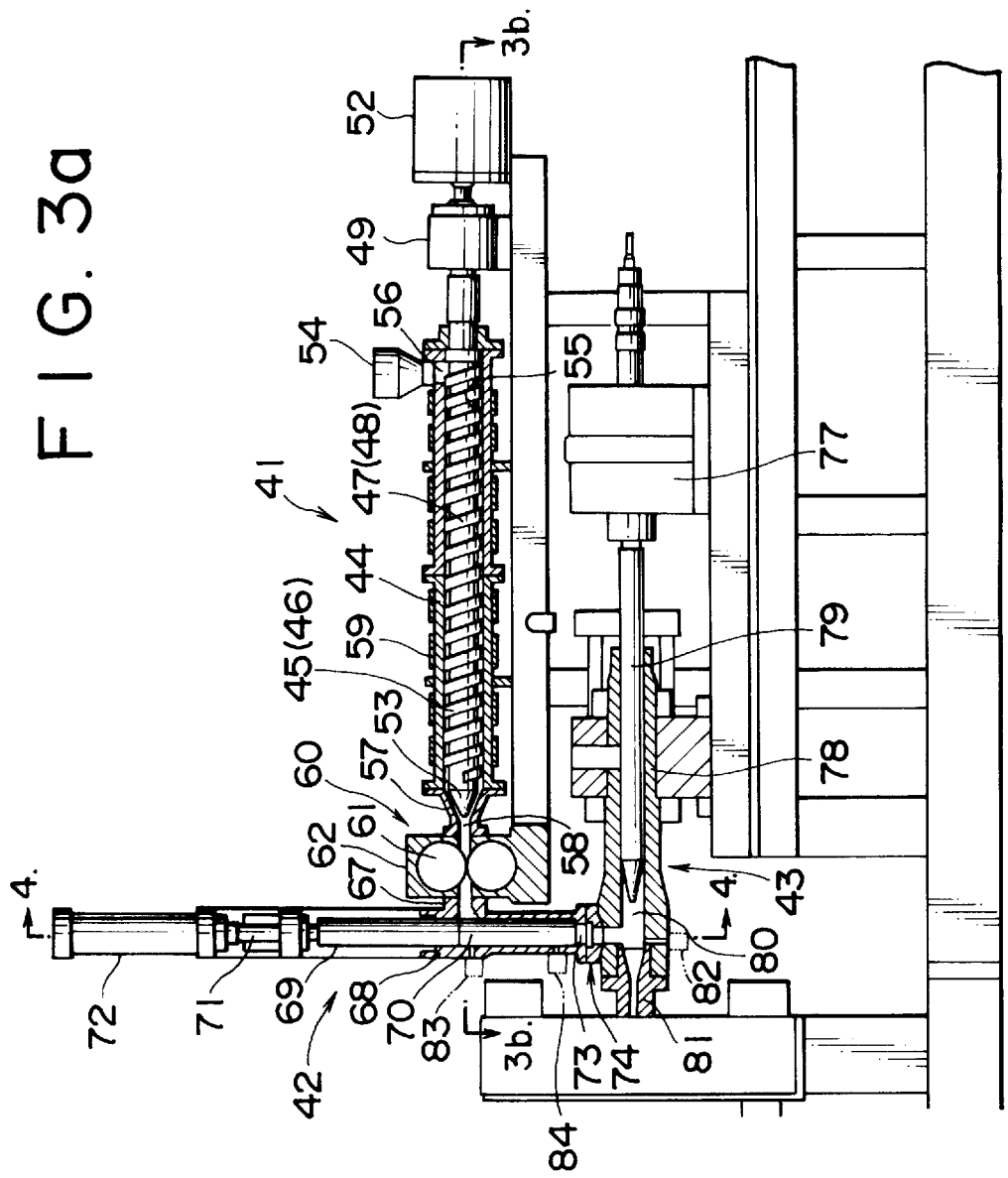
FIG. 3(a) is a front cross-sectional view and FIG. 3(b) is a cross-sectional view along lines B—B of FIG. 3(a) of another embodiment of the long fiber-reinforced thermoplastic resin injection molding unit of this invention.
Figure 3B:
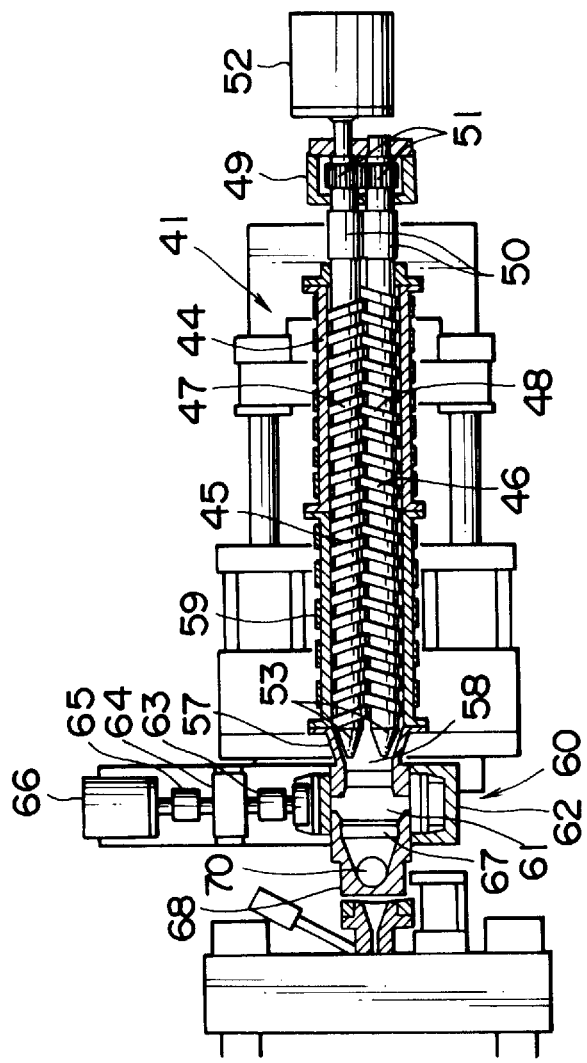

FIGS. 3(a) and 3(b) are descriptive drawings of another embodiment of the injection molding unit of this invention. FIG. 3(a) is a front cross-sectional view and FIG. 3(b) is a cross-sectional view along lines B—B of FIG. 3(a). In these figures are shown a dual shaft screw plasticizing unit 41, an accumulator 42, and an injection molder 43.

The dual shaft screw plasticizing unit 41 has the same basic structure as the dual shaft screw plasticizing unit 1 shown in FIG. 1 for the first embodiment. That structure being the screws 45 and 46 positioned in parallel in cylinder 44 and rotating in different directions. The screws 45 and 46 are single-threaded screws and the teeth 47 and 48 for each screw are fixed axially in the cross-sectional view as shown in FIG. 1(b) of embodiment 1 and the groove for the teeth 47 and 48 as clearly shown in FIG. 1(b) is deep and has complementary low compression ratios (compression ratio 1–1.5).

The screws 45 and 46 pass through the cylinder 44 and are mutually supported by shaft 50 having the gear 51 installed in the external gear box 49 and are made to mutually rotate in different directions by the hydraulic motor 52 installed at one end of the shaft 50. The other end, in the cylinder 44 forms a conical or semi-circular shape at the head 53. A heat path may be formed in the center of the shaft 50, the said heat path being a hole from the rear to just prior to the head 53, with a pipe mounted in the interior of this pipe and the interior and exterior of the pipe used as the flow path. Another alternative is to insert a cartridge heater in the center of the shaft 50 rather than using the above heating means.

A hopper 54 is provided in proximity to one end of the cylinder 44. The lower opening of the hopper 54 connects to the opening 56 at one end of the cylinder chamber 55 inside the cylinder 44 to receive the pellets of thermoplastic resin mixed with long fibers dumped from the hopper 54. The oblique piece 57 is formed in a funnel shape following the exterior contour of the conical or semi-circular shape of the head 53 of the screws 45 and 46, and at the tip of the oblique piece 57 a slit-shaped exit 58 is formed. An electrical heater 59 is formed in the outer circumference of the cylinder 44 to heat the cylinder chamber 55 to approximately 200° to 350° C. The said pellets dumped from the hopper 54 are heated and melted when conveyed from one end to the other end inside the cylinder chamber 55 by the screws 45 and 46 rotating in different directions. In this embodiment, a pressure applicator roll unit 60 was the pressure application means at the tip of the said oblique piece 57 and the accumulator unit 42 is connected at the end of said oblique piece 57.

The pressure applicator roll unit 60 is comprised of a pair of rolls in parallel inside the roll box 62, and a gear box 64 having gears connected by means of a coupling 63 and the shaft of the roll section 61, and a hydraulic motor 66 connected by means of the coupling 66 and any or some of the gears in the gearbox 64. The said pair of rolls 61, rotate in the extraction direction, the molten resin conveyed from the tip of the cylinder 44 by means of the gears in the gearbox 64 driven by the hydraulic motor 66. The said pair of rolls then pressurizes and mixes the molten resin and further disentangles (smooth out the fiber bundles and improve the resin content in the fibers) and send the resin from the exit of the roll box 62 to the accumulator unit 42.

Figure 4:
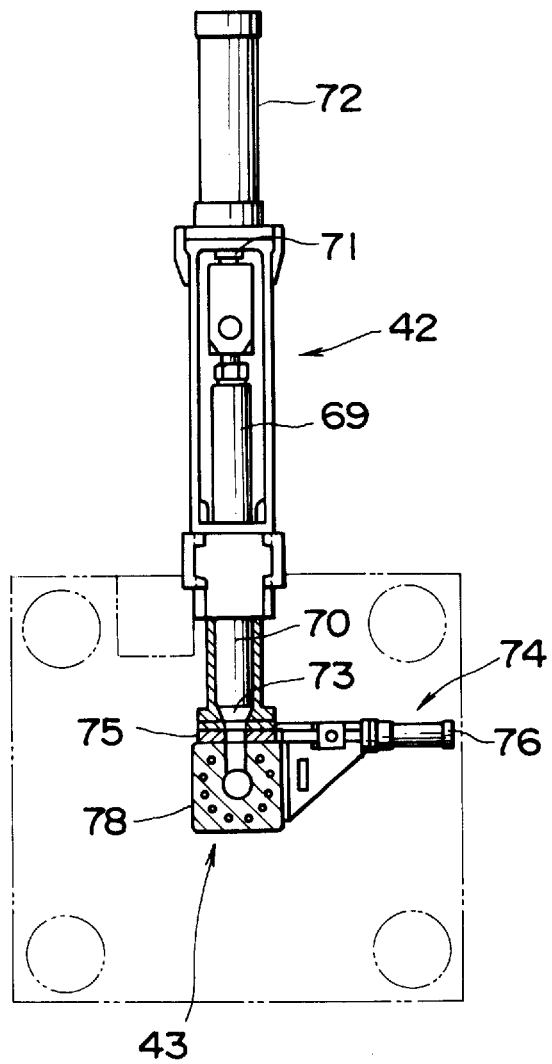
FIG. 4 is a cross-sectional view taken along lines C—C of FIG. 3(a).

The accumulator 42 is comprised of the cylinder 68 and the flange 67. The accumulator chamber 70 is formed at the tip of the plunger 69. The periphery of the accumulator chamber 70 is heated by a heater not shown in the drawings. A press-in hydraulic cylinder 72 is connected to the rear end of the plunger 69 by means of the rod 71. The exit 73 at the tip of the accumulator chamber 70 is connected to the injection molder 43 by means of the open/close valve 74. As shown in FIG. 4, the open/close valve 74 is structured to freely control the inlet and outlet from the exit 73 by driving the stop plate 75. Instead of the open/close valve 74 described here, other valves such as rotary valves or other type of open/close valves may be used.

The injection molder 43 has the same basic structure as the injection molder 2 shown in the first embodiment. Resin supplied into the cylinder chamber 80 is injectable into the mold from the nozzle 81 (not shown in the figure) by means of the pressing action of plunger 79 inside the cylinder 78 in turn operated by the hydraulic cylinder 77. The outer circumference of the cylinder 78 is provided with a heater (not shown in the figure) to maintain a specified temperature inside the cylinder chamber 80.

In the operation of the said equipment, first, the pellets of thermoplastic resin mixed beforehand with long fibers, namely glass fibers of 3 to 25.4 mm in length, are dumped into the hopper 54. The inside of the cylinder chamber 55 is heated to approximately 200° to 350° C. by means of the heater 59 in the outer circumference of the cylinder 44. The hydraulic motor 52 drives the two screws 45 and 56 in different directions at the same speed by means of the gear 51 in the gear box 49. The pellets supplied to cylinder chamber 55 by way of the opening in the bottom of the hopper 54 are then conveyed from one end of the cylinder chamber 55 to the other. In this case, since the transport and the mixture of the pellets is carried out without much kneading and because of low compression ratio and deep grooves in screws 45 and 46, detailed damage to the long threads from cutting during the kneading process is prevented.

Thus, the deficiency of the cutting heat generated by operation of screws 45 and 46 for the pellets in the cylinder 44 is compensated by the above said heating means, and the pellets are melted and conveyed to the exit 65 of the cylinder 44. The gas generated at this time is discharged to the outside through the hopper 54. In this case, the molten resin sent from the exit 53 of the cylinder 44 is drawn out from between the pair of rollers 61 rotating in different directions in pressure application roll 60, and then the fibers mixed into the resin during the pressure between the rolls 61 are further disentangled (smooth out the fiber bundles and improve the resin content in the fibers) the long fibers. The molten resin drawn out from between the rolls 61 is then sent to the accumulator 42 from the exit 67 of the roll box 62. The tip outlet 73 of the accumulator 42 closes when the stopper plate 75 of the open/close valve advances, and the molten resin sent from the pressure application roll 60 fills the inside of accumulator chamber 70. Afterwards, the stopper plate 75 of the open/close valve 74 reverses and the outlet 73 opens and at the same time the press-in hydraulic cylinder 72 operates to press the plunger 69 so that the molten resin inside the accumulator chamber 70 is supplied to the inside of the cylinder 80 from the injection molder 43. The supply and the weighing of the molten resin in the cylinder chamber 80 at this time is performed by the opening of the open/close valve 74 and operating the press-in hydraulic cylinder 72 to lower the plunger 69. The lowering of this plunger 69 applies pressure to the molten resin so that supply and weighing of the molten resin is carried out while the plunger 79 of the injector molder 43 is reversing under keeping constant pressure to the molten resin. This plunger 79 retracts only by the stroke length preset by a position sensor such as a limit switch or encoder which in turn allows supply and weighing of the molten resin.

The example in this embodiment described a pressure application means provided between the dual shaft screw plasticizing unit 41 and the accumulator 42, however another alternative is to press out the resin through the slit shape exit 58 in the cylinder 44 without providing a pressure application roll 60. Yet another alternative means is to use a static mixer instead of the pressure application roll 60 to pressurize and mix the molten resin as needed and further disentangle (smooth out the fiber bundles and improve the resin content in the fibers) the long fibers.

Figure 5B:
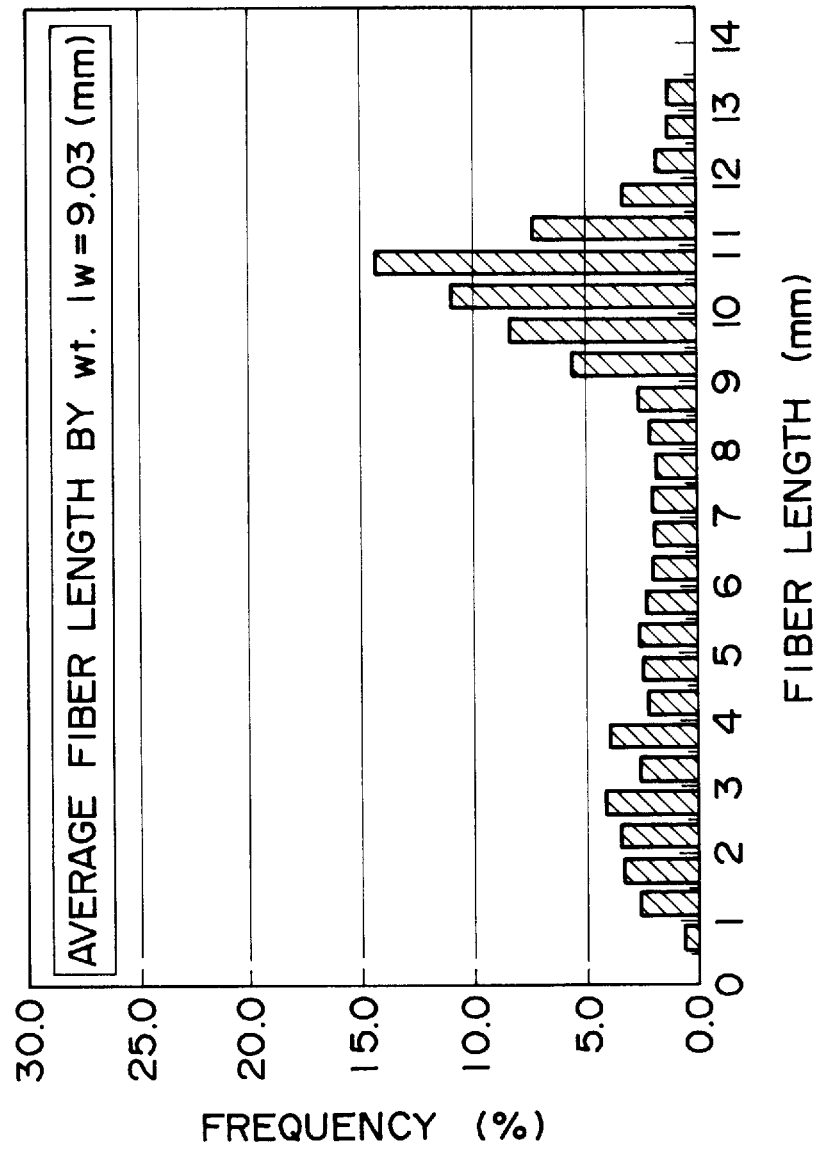
FIG. 5(a) is a graph showing fiber length distribution after use of the dual shaft screw plasticizing unit and FIG. 5 (b) is a graph showing fiber length distribution after use of the pressure application roll unit.
Figure 6:
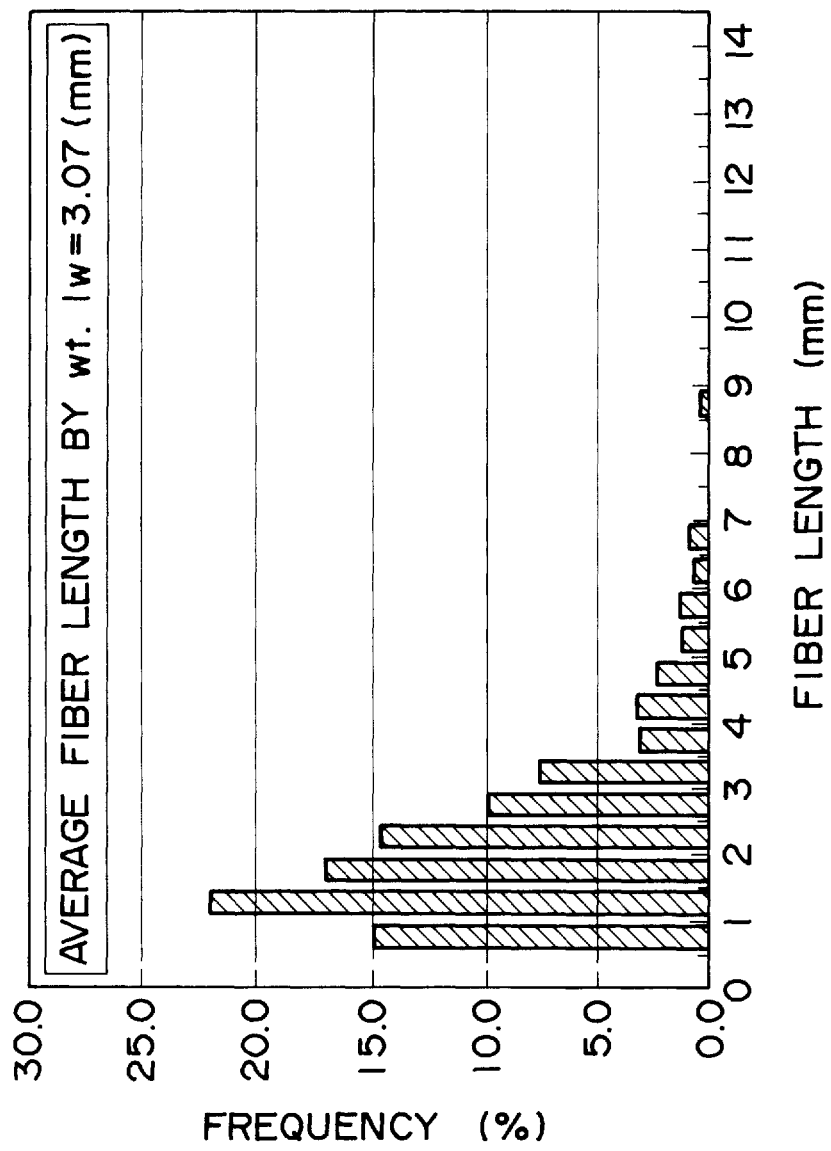
FIG. 6 is a graph showing fiber length distribution after use of the conventional dual axis screw plasticizing unit.
Figure 7:
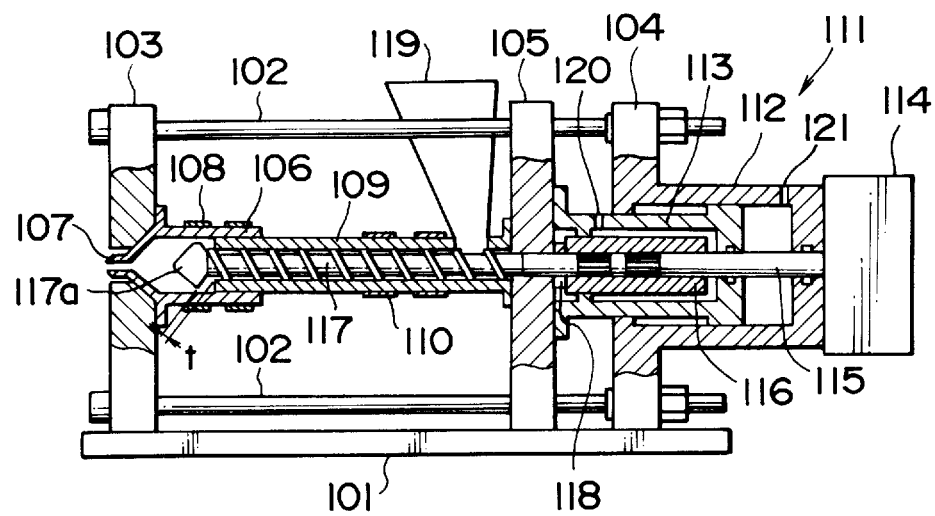
FIG. 7 is a cross-sectional view of an example of the current art.
Figure 8:
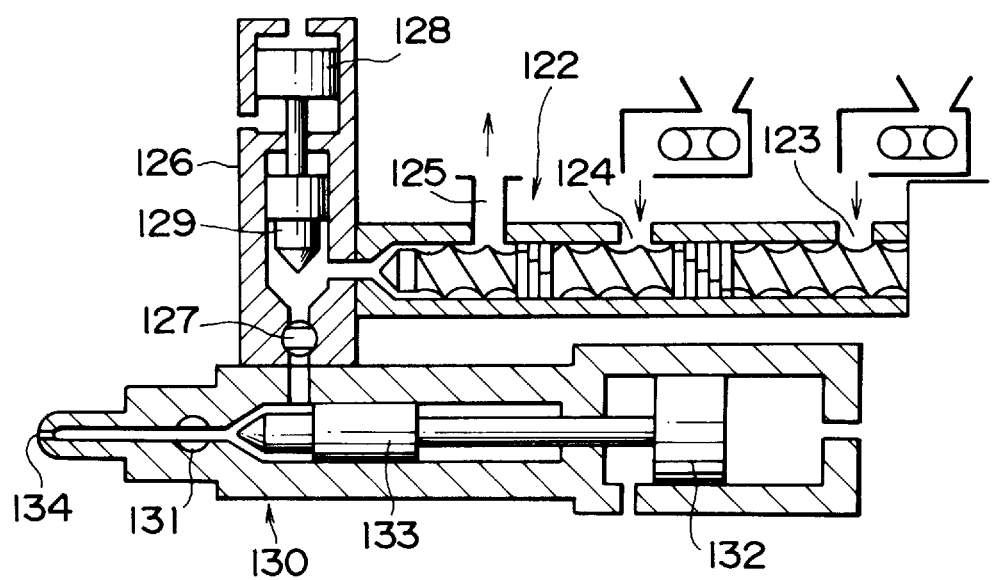
FIG. 8 is a cross-sectional view of another example of the current art.

An examination was made respectively of fiber length distribution after resin pellets of 3 mm dia.×11 mm length passed through the mold injector unit as structured in the third embodiment and the dual shaft screw plasticizing unit 41, and also of fiber length distribution after further passing through the pressure application roll 60 (roll dia. 200 mm, gap between rolls 0.5 mm, and roll rpm of 20.0). The results in FIG. 5(a) show the distribution after passing through the dual shaft screw plasticizer unit, and those of FIG. 5(b) show the distribution after further passing through the pressure application roll 60. FIG. 6 shows the fiber length distribution after passing through a nozzle of a conventional injection molding unit.

FIGS. 5(a) and 5(b) as well as FIG. 6 clearly show that after passing through the dual shaft screw plasticizing unit of this invention as in FIG. 5(a), that the fiber length distribution showed a high frequency of approximately 60 percent concentrated between 9 and 12 mm and there was little damage to the fibers. Afterwards, even when passed through the pressure application roll of this invention in FIG. 5(b), the fiber length distribution showed a high frequency of approximately 50 percent concentrated between 9 to 12 mm and with little damage to the fibers. In contrast, after passing through the conventional dual shaft screw plasticizing unit, the fiber length distribution showed a high concentration of approximately 90 percent between 1 to 4 mm and almost all of the fibers had been damaged from cutting force due to kneading.

Results of visual observation made along with this examination showed that numerous fiber bundles could be found after passing through just the dual shaft screw plasticizing unit 41 but that after having then passed through the pressure application roll 60, the fiber bundles were spread out flatly as if crushed and the fibers were disentangled and dispersed.

The said third embodiment described an example in which when the resin in the accumulator chamber 70 of the accumulator 42 is supplied into the cylinder chamber 70 from the injection molder 43, the supply and weighing of the molten resin is carried out by opening the open/close valve 74, operating the press-in cylinder 72 to lower the plunger 69 and applying pressure to the molten resin by the lowering of e plunger 69 while the plunger 79 of injection molder 43 is moved in reverse. However in this case, when the resistance is too large during reversing of the plunger 79, the pressure becomes high in particular during the process where the resin flows from the accumulator chamber 70 to the cylinder chamber 80 (for instance 70 to 100 kg/cm$^2$ when normally about 50 kg/cm$^2$ is preferred) and damage to the long fibers is prone to occur. However when braking of the reversing movement of the plunger 79 is performed in order to decrease this resistance, the weighing accuracy of the molten resin declines.

Whereupon to solve the above problem, as shown for instance in both FIGS. 3(*a*) and 3(*b*), a pressure sensor is installed for detecting the pressure inside the cylinder chamber in the cylinder 78 in the injection molder 43, and also pressure sensors 83 and 84 are installed for detecting pressure inside the accumulator chamber 70 in the cylinder 68 of the injection molder 42, and the pressure is detected inside the cylinder chamber 80 with at least the said pressure sensor 82, and the hydraulic pressure on the reversing side of the hydraulic cylinder 77 is then regulated to stay below 50 kg/cm$^2$ while the plunger 79 is moved in reverse. The reversing speed of the plunger 79 can be controlled at this time according to the lowering speed of the plunger 69 and the value from the sensor 82. Also at this time, the pressure inside the accumulator chamber 70 can be detected by the said pressure sensors 83 and 84 and the reversing speed of the plunger 79 regulated based on the values from these sensors 83 and 84, so that along with highly precise control by absorbing pressure variations in the plasticized long fiber resin, damage to the long fibers is inhibited and weighing accuracy of the molten resin is maintained.

Control of the lowering speed of the said plunger 69, the reversing speed of the plunger 79 and the pressure values of the pressure sensors 83, 83 and 84 is carried out by connecting the said pressure sensors 82, 83 and 84 to the control section of a programmable controller (not shown) and by control systems such as flow control valves and switching solenoids installed in the hydraulic circuits of the accumulator 42, and the hydraulic circuit of the injector molder 43. For instance, the pressure values detected by the pressure sensors 82, 83 and 84 are input to the control section and compared at set time intervals with preset pressure values (for instance 50 kg/cm$^2$) and when the sensor pressure reading exceeds the preset value, the flow control valve in the said hydraulic circuit operates to control the pressure in the hydraulic circuit so the specified pressure is obtained.

This means may be implemented in other various forms without deviating from the spirit or the main features of this invention. Accordingly the aforementioned embodiments constitute nothing more than examples and should not to be interpreted in a limited form, furthermore all changes relating to the uniform range of the claims, fall within the scope of this invention.

What is claimed is:

1. An injection molding unit for long fiber-reinforced thermoplastic resin, comprising:

a dual screw plasticizing unit for melting and kneading pellet-shaped long fiber-reinforced thermoplastic resin said plasticizing unit including a cylinder having a heater, and two screws with deep grooves and low compression ratios, arranged in parallel with each other in said cylinder;

a pressure application means for applying pressure to disentangle the long fiber-reinforced thermoplastic resin in a molten state coming from an exit of said dual screw plasticizing unit; and an injection molder connected to an exit of the said pressure application means for taking in the molten, long fiber-reinforced thermoplastic resin and injecting said resin into a mold.

2. An injection molding unit according to claim 1, wherein said pressure application means is a gate whose opening and closing can be regulated.

3. An injection molding unit according to claim 1, wherein said pressure application means is a pair of rollers rotating in different directions and arranged in parallel with a gap arranged between the said pair of rollers.

4. An injection molding unit according to claim 3, wherein said pair of rollers rotating in different directions is able to adjust the roll rotation speed.

5. An injection molding unit according to claim 1, further comprising; a heating means for heating said long fiber-reinforced thermoplastic resin at said screw of said screw plasticizing unit.

6. An injection molding unit according to claim 5, wherein said heating means comprises a heat path provided along an axial center of an inner part of the said screw; and a heat supply means connected to the said heat path by means of a rotary joint provided in the said heat path.

7. An injection molding unit according to claim 1, further comprising; a heating gas supply means which supplies gas to the inner part of said cylinder of said screw plasticizing unit, is connected to the said cylinder.

8. An injection molding unit according to claim 1, further comprising; an accumulator comprised of a cylinder and plunger is installed in between the exit of said pressure application means and said injection molder.

9. An injection molding unit according to claim 2, further comprising; an accumulator comprised of a cylinder and plunger is installed in between the exit of said pressure application means and said injection molder.

10. An injection molding unit according to claim 3, further comprising; an accumulator comprised of a cylinder and plunger is installed in between the exit of said pressure application means and said injection molder.

11. An injection molding unit according to claim 4, further comprising; an accumulator comprised of a cylinder and plunger is installed in between the exit of said pressure application means and said injection molder.

12. An injection molding unit according to claim 1, wherein said thermoplastic resin is reinforced with glass fibers of 3 to 4.25 mm in length.

13. An injection molding it according to claim 2, wherein said thermoplastic resin is reinforced with glass fibers of 3 to 4.25 mm in length.

14. An injection molding unit according to claim 3, wherein said thermoplastic resin is reinforced with glass fibers of 3 to 4.25 mm in length.

15. An injection molding unit according to claim 4, wherein said thermoplastic resin is reinforced with glass fibers of 3 to 4.25 mm in length.

16. An injection molding unit according to claim 5, wherein said thermoplastic resin is reinforced with glass fibers of 3 to 4.25 mm in length.

17. An injection molding unit according to claim 6, wherein said thermoplastic resin is reinforced with glass fibers of 3 to 4.25 mm in length.

18. An injection molding unit according to claim 7, wherein said thermoplastic resin is reinforced with glass fibers of 3 to 4.25 mm in length.

19. An injection molding unit according to claim 8, wherein said thermoplastic resin is reinforced with glass fibers of 3 to 4.25 mm length.

* * * * *